(12) United States Patent
Day

(10) Patent No.: US 7,399,807 B2
(45) Date of Patent: Jul. 15, 2008

(54) HYDROPHOBIC, OLEOPHOBIC AND ALCOHOL-RESISTANT FLUOROCHEMICAL ADDITIVE

(75) Inventor: James F. Day, Winston-Salem, NC (US)

(73) Assignee: Unitex Chemical Corporation, Greensboro, NC (US)

( * ) Notice: Subject to any disclaimer, the term of this patent is extended or adjusted under 35 U.S.C. 154(b) by 279 days.

(21) Appl. No.: 10/887,451

(22) Filed: Jul. 9, 2004

(65) Prior Publication Data

US 2006/0008651 A1    Jan. 12, 2006

(51) Int. Cl.
    *C08F 259/08*    (2006.01)
(52) U.S. Cl. .................. 525/276; 524/507; 508/465; 508/478
(58) Field of Classification Search .................. 525/276; 508/465, 478; 524/507
    See application file for complete search history.

(56) References Cited

U.S. PATENT DOCUMENTS

| 4,832,859 | A | * | 5/1989 | Basset et al. ................. 508/500 |
| 6,284,843 | B1 | * | 9/2001 | Jariwala et al. ............. 525/276 |
| 6,413,918 | B1 | * | 7/2002 | Beatty ......................... 508/465 |
| 6,683,128 | B2 | * | 1/2004 | Turri et al. ................... 524/515 |
| 6,946,515 | B1 | * | 9/2005 | Lettmann et al. ............ 524/591 |
| 2003/0162903 | A1 | * | 8/2003 | Day ............................. 525/276 |
| 2004/0087709 | A1 | | 5/2004 | Crater |
| 2004/0097158 | A1 | | 5/2004 | Rudisill |

OTHER PUBLICATIONS

Zonyl BA Fluorotelomer MSDS, DuPont Chemical (Apr. 19, 2001).
Lange, Cleston C.; Biodegradation Screen Study for Telomer-Type Alcohols, Nov. 6, 2002.

* cited by examiner

*Primary Examiner*—Peter D. Mulcahy
*Assistant Examiner*—Henry Hu
(74) *Attorney, Agent, or Firm*—Roylance, Abrams, Berdo & Goodman, L.L.P.

(57) ABSTRACT

A fluorochemical additive is the reaction product under polymerization conditions of monomers that include: (a) an aromatic polycarboxylic acid as an anhydride, ester, or ester chloride; (b) at least one fluorinated reactant; and (c) at least one aliphatic amine, mercaptan, or alcohol. Optionally, a crosslinking agent can be used. The components of the additive all can be viewed as contributing to the performance of the disclosed additive. The fluorine-containing component is generally insoluble in molten polymers and will tend to migrate to the cooled surface thereof where the fluorinated moieties provide repellency characteristics when used in adequate quantities, generally at least about 30 wt % depending on the fluorinated reactant used to make the additive. The aromatic component appears to facilitate solubility and speed up the orientation process of the additive within the molten polymer. The aliphatic component to the reaction mixture appears to assist in anchoring the reaction product additive in the bulk polymer structure. Together, the components form a fluorinated reaction product additive that can be added to a molten polymer for integration into the resulting product to impart improved resistance to oil, water, and alcohol.

17 Claims, No Drawings

HYDROPHOBIC, OLEOPHOBIC AND ALCOHOL-RESISTANT FLUOROCHEMICAL ADDITIVE

FIELD OF THE INVENTION

This invention relates to a fluorochemical additive that is useful for incorporation into fibers, films and molded articles to enhance resistance to water, oil, and alcohol.

BACKGROUND OF THE INVENTION

Synthetic organic polymers are employed widely to create a variety of products. Included among such varied products are blown and cascade films, extruded sheets, foams, fibers, products made from foam and fibers, woven and knitted fabrics, non-woven fibrous webs and molded articles for garment, upholstery and medical uses, to name a few. Many polymers used in these products, such as polypropylene, exhibit some water and/or alcohol resistance but exhibit no oil resistance.

The use of various fluorochemical agents to topically treat a variety of fibers and fibrous substrates such as textiles, carpet, leather, paper and non-woven webs, to impart desirable properties to these materials, is known. See for example Mason Hayek, *Waterproofing and Water/Oil Repellency*, 24, Kirk-Othmer Encyclopedia of Chemical Technology, pp. 448-455 ($3^{rd}$ Edition 1979) or Banks, Ed., *Organofluorine Chemicals and Their Industrial Applications*, Ellis Horwood Ltd., Chichester, England, pp. 226-234 (1979). Such fluorochemical compositions include fluorochemical urethane and urea-based oligomers as disclosed in U.S. Pat. No. 3,398,182 of Guenthner et al.; U.S. Pat. No. 4,001,305 of Dear et al.; U.S. Pat. No. 4,215,205 of Landucci et al.; U.S. Pat. No. 4,606,737 of Stem; U.S. Pat. No. 4,668,406 of Chang; U.S. Pat. No. 4,792,354 of Matsuo et al. and U.S. Pat. No. 5,410,073 of Kirchner; compositions of cationic and non-cationic fluorochemicals as disclosed in U.S. Pat. No. 4,566,981 of Howells; and compositions containing fluorochemical carboxylic acid and epoxidic cationic resin as disclosed in U.S. Pat. No. 4,426,466 of Schwartz and U.S. Pat. No. 6,127,485 of Klun et al., as well as in PCT application WO 99/05345, also of Klun et al.

Also known are fluorochemical esters as disclosed in U.S. Pat. No. 6,063,474 of Raiford et al.; U.S. Pat. No. 5,859,126 of Anton et al.; U.S. Pat. No. 3,923,715 and U.S. Pat. No. 4,029,585, both of Dettre; U.S. Pat. No. 3,716,401 of Axelrod; and U.S. Pat. No. 4,264,484 of Pattel; and fluorochemical esters derived from dimerized unsaturated fatty acids as disclosed by U.S. Pat. No. 4,539,006 of Langford and WO 93/10085 of Coppens et al. These fluorochemicals can be applied to various substrates by methods known in the art, including spraying, padding, and finish bath immersion, or can be applied directly to the fiber before the fiber is woven by incorporating the fluorochemical into the fiber spin finish.

Blending a variety of fluorochemicals with synthetic organic polymers and melt extruding fibers from the molten blend to produce fiber and fibrous substrates exhibiting hydrophobicity (water resistance) and oleophilicity (oil resistance) is also known. Such patents include U.S. Pat. No. 5,025,052 of Crater et al.; U.S. Pat. No. 5,380,778 of Buckanin; U.S. Pat. No. 5,451,622 of Boardman et al.; U.S. Pat. No. 5,411,576 of Jones et al.; U.S. Pat. No. 5,300,587 of Mascia et al.; and U.S. Pat. No. 5,336,717 of Rolando et al.

While these various fluorochemical melt additives can in some cases impart satisfactory hydrophobicity and/or oleophobicity to resins, many suffer poor thermal stability above the 200° C. melt processing temperature which is often encountered in the industry. It would be desirable to have a fluorochemical additive that was stable at the temperatures used in commercial polymer processing and forming equipment.

Others, such as the melt additives of Klun et al., U.S. Pat. No. 6,127,485 and WO 99/05345, are thermally stable at high processing temperatures but are required to be used in unacceptably high amounts so as to make them economically undesirable.

It would be desirable to have a fluorochemical additive that could be incorporated into molten polymers or curable thermoset polymers that could be formed into fibers, films, fabrics (woven or nonwoven) or cast articles to enhance the inherent water, oil, and/or alcohol resistance of the resulting product.

SUMMARY OF THE INVENTION

It is an object of the invention to provide a polymeric fluorochemical additive that is stable at the elevated temperatures used in commercial polymer processing and forming equipment.

It is another object of the invention to provide a fluorochemical additive that can be incorporated into thermoplastic and thermoset polymers that can be formed into fibers, films, textiles (woven or nonwoven), and castings that will enhance the inherent water, oil, and/or alcohol resistance of the resulting product.

It is further an object of the invention to provide fibers, films, textiles (woven or nonwoven), and castings made of thermoplastic and thermoset polymers that exhibit enhanced resistance to water, oil, and or alcohol exposure than the same product made with the same polymeric components but without the fluorochemical additive of the present invention.

In accordance with these and other objects of the invention that will become apparent from the description herein, the fluorochemical additive of the present invention comprises the reaction product under polymerization conditions of components that include: (a) an aromatic polycarboxylic acid as an anhydride, ester, or ester chloride; (b) at least one fluorinated reactant; and (c) at least one aliphatic amine, mercaptan, or alcohol. Optionally, a crosslinking agent can be used in addition to the above components.

The three components of the additive all can be viewed as contributing to the performance of the additive. The fluorine-containing component is generally insoluble in molten polymers and will tend to migrate to the cooled surface thereof where the fluorinated moieties provide repellency characteristics when used in adequate quantities. The aromatic component appears to facilitate solubility and speed up the orientation process of the additive within the molten polymer. The aliphatic component to the reaction mixture appears to assist in anchoring the reaction product additive in the bulk polymer structure. Together, the components form a fluorinated reaction product additive that can be added to a molten polymer for integration into the resulting product to impart improved resistance to oil, water, and alcohol.

DETAILED DESCRIPTION OF THE INVENTION

The fluorochemical additive of the present invention comprises the reaction product formed under polymerization conditions of components that include: (a) an aromatic polycarboxylic acid as an anhydride, ester, or ester chloride; (b) at least one fluorinated reactant; and (c) at least one aliphatic amine, mercaptan, or alcohol. Preferably, the monomers include, and preferably consist essentially of: (a) an anhydride monomer; (b) a fluorine-containing amine, alcohol, or mercaptan; and (c) a reactive aliphatic amine, mercaptan or alcohol.

The resulting fluorochemical additive product of the present invention is in the form of a polymer or oligomer, preferably a solid, that can be ground to a fine powder (if needed) and can be added to thermoplastic and thermoset monomer mixtures for reactive incorporation into products made from these monomers. The fluorochemical additive of the invention is thermally stable and remains effective despite exposure to elevated melt processing or exothermic curing temperatures. When added to a molten polymer for incorporation therein, the fluorochemical additive of the invention imparts increased resistance to water, oil, and alcohol.

The anhydride monomer is intended to refer to monomers that contain at least one anhydride functional group or are capable of forming an anhydride functional group under the polymerization conditions of the present invention. Such monomers can include acids, anhydrides, chlorides, or esters. Carboxylic acids preferably have 2-4 carboxylic acid groups and carboxylic acid anhydrides. Suitable anhydride monomers include aliphatic, cycloaliphatic, and aromatic anhydrides. Examples include maleic acid, maleic anhydride, itaconic acid, itaconic anhydride, 3-butene-1,2,3-tricarboxylic acid, acrylic anhydride, allylsuccinic anhydride, citraconic anhydride, methacrylic anhydride, trimellitic anhydride, fumaric acid, fumaric anhydride, vinyl acetic acid, vinyl acetic anhydride, norbornene dicarboxylic acid, norbornene tricarboxylic acid, norbornene anhydride, cyclopentadiene dicarboxylic acid, cyclopentadiene tricarboxylic acid, cyclopentadiene anhydride, cyclohexyl dicarboxylic acid, cyclohexyl tricarboxylic acid, cyclohexyl anhydride, and the like. Preferably, the anhydride monomer is an anhydride selected from the group maleic anhydride, acrylic anhydride, allylsuccinic anhydride, citraconic anhydride, methacrylic anhydride, and trimellitic anhydride including the acid chlorides thereof.

Aromatic acids, anhydrides, chlorides, or esters are particularly preferred. Recommended aromatic forms include phthalic, isophthalic, terephthalic, and pyromellitic with specific note of napthalene dicarboxylic acid and the dimethyl ester thereof.

The fluorine-containing reactant is conveniently described by the general formula RfQ in which the Rf moiety may be a partially fluorinated or perfluorinated straight or branched chain group comprising about 2 to about 40 carbon atoms in length, more typically about 6 to about 18 carbon atoms. This fluorochemical group may be completely fluorinated or may have some hydrogen substituents, i.e., between 2 and about 6. In a preferred embodiment, the Rf portion is tetrahydro-substituted, with the remaining substituents being fluorine. In still other embodiments, the fluorochemical group of the fluorochemical reactant may comprise a long chain perfluorogroup, optionally partially hydrogen substituted, at one end of which is a sulfonamide group. In yet other embodiments, all of the carbon atoms of the reactive fluorochemical portion of the reactant may be completely fluorinated. In still other embodiments, the fluorochemical portion of the reactant may be branched, e.g., by up to about ⅓, as described in U.S. Pat. No. 6,048,952 of Behr et al., herein incorporated by reference.

The group Q which is joined to Rf portion may be a terminating ($CH_3$—) or ($CHF_2$—) group, or may be a divalent or a trivalent linking group, may be a branched or straight chain alkyl, alkoxy, or alkylthio group, optionally interrupted by other heteroatoms. In some embodiments, the Q group may comprise a combination of the above-described moieties. The chemical makeup of the linking group Q is not important so long as it neither interferes with the polymerization of the fluorochemical reactant with the anhydride monomer and reactive alcohol/amine reactants used in the present invention, nor deleteriously effects the properties of the end product.

In addition to relatively simple fluorochemical reactant compounds in which the fluorochemical group is bonded to a single reactive group by a covalent bond, there may be used compounds which contain more than one reactive group; compounds that are branched; and compounds that include Q groups which may contain carbon, hydrogen, and heteroatoms. A non-limitative group of other such fluorochemical reactants is listed below:

$$(Rf)-CH_2CH_2CH_2-O-(CH_2CH_2CH_2-O)_zH \quad \text{I.}$$

$$(Rf)-CH_2CH_2CH_2-S-(CH_2CH_2CH_2O)_zH \quad \text{II.}$$

$$(Rf)-CH_2CH_2-O-(CH_2CH_2CH_2O)_zH \quad \text{III.}$$

$$(Rf)-CH(CH_3)-O-(CH_2CH_2CH_2O)_zH \quad \text{IV.}$$

$$(Rf)-(CH_2CH_2O)_zC(O)-OH \quad \text{V.}$$

$$(Rf)-(CH_2CH_2)_zC(O)-OH \quad \text{VI.}$$

$$(Rf)-(CH_2CH_2CH_2O)_zC(O)-OH \quad \text{VII.}$$

$$(Rf)-(CH_2CH_2O)_zCH_2-NH_2 \quad \text{VIII.}$$

$$(Rf)-(CH_2CH_2CH_2O)_zCH_2-NH_2 \quad \text{IX.}$$

$$(Rf)-(CH_2CH_2-S-CH_2O)_zCH_2-NH_2 \quad \text{X.}$$

$$(Rf)-CH(CH_3)CH_2-NH_2 \quad \text{XI.}$$

$$(Rf)-CH_2CH_2CH_2-NH_2 \quad \text{XII.}$$

$$(Rf)-CH_2CH_2-S-CH_2-NH_2 \quad \text{XIII.}$$

$$(Rf)-(CH_2CH_2O)_z-C(O)-NH-CH_2CH_2-OH \quad \text{XIX.}$$

$$(Rf)-(CH_2CH_2CH_2O)_zCH_2-SH \quad \text{XX.}$$

$$(Rf)-CH_2CH_2CH_2CH_2-SH \quad \text{XXI.}$$

$$(Rf)-(CH_2CH_2O)_z-C(O)-NHCH_2CH_2-OH \quad \text{XXII.}$$

$$(Rf)-CH_2CH_2-C(O)-NHCH_2CH_2-OH \quad \text{XXIII.}$$

$$(Rf)-C(O)-CH_2CH_2-SH \quad \text{XXIV.}$$

$$(Rf)-C(O)-CH_2CH_2CH_2CH_2-SH \quad \text{XXV.}$$

$$(Rf)-C(O)-(CH_2CH_2CH_2O)_z-CH_2CH_2CH_2O-NH_2 \quad \text{XXVI.}$$

$$(Rf)-C(O)-CH_2CH_2OCH_2CH_2O-NH_2 \quad \text{XXVII.}$$

$$(Rf)-NH_2-CH_2CH_2CH_2OCH_2-C(O)OH \quad \text{XXVIII.}$$

XXIX.
[(Rf)CH₂CH₂OCH₂]\\
              C(CH₂OH)(CH₂OH)\\
[(Rf)CH₂CH₂OCH₂]

XXX.
[(Rf)CH₂CH₂OCH₂]\\
              C(CH₂OH)(CH₂CH₂OCH₂(Rf))\\
[(Rf)CH₂CH₂OCH₂]

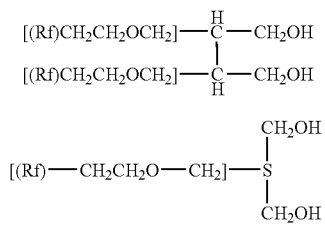

XXXI.

XXXII.

wherein z may be a number from 1 to about 40 and wherein Rf is a branched or straight chain fluorinated group as defined elsewhere herein. Also, epoxidized variants of the above may be used.

Preferably, the fluorine-containing reactant is an alcohol may be a partially fluorinated or perfluorinated straight or branched chain comprising about 2 to about 40 carbon atoms in length, more typically about 6 to about 18 carbon atoms. This fluorochemical group may be completely fluorinated or may have some hydrogen substituents, i.e., between 2 and about 6. In a preferred embodiment the fluorine-containing alcohol is tetrahydro-substituted, with the remaining substituents being fluorine. A commercially available form of such a telomere is sold under the name Zonyl® BA fluorotelomer from DuPont Chemical Enterprises, Wilmington, Del. This is a mixture of even numbered 6-18 carbon atom 1,1,2,2-tetrahydroperfluoro-1-alcohols, the majority of which are eight to twelve carbon atoms in length. The mixture has a boiling point of 145-245° C. at 1 atm; a melting point of 55-65° C. and a specific gravity of 1.7.

In still other embodiments, the fluorochemical group of the fluorochemical reactant may comprise a long chain perfluoro-group, optionally partially hydrogen substituted. In yet other embodiments, all of the carbon atoms of the reactive fluorochemical portion of the reactant may be completely fluorinated. In still other embodiments, the fluorochemical portion of the reactant may be branched, e.g., by up to about ⅓, as described in U.S. Pat. No. 6,048,952 of Behr et al., herein incorporated by reference.

A perfluorinated alcohol can be prepared either by a telomerization process, or by direct fluorination as described in one or more of U.S. Pat. Nos. 5,506,309; 5,523,496; 5,539,059; 5,543,567; 5,557,012; 5,571,870; 5,674,949, the contents of each of which are incorporated herein by reference. Telomerization generally resulted in a product with a distribution of different fluorocarbon lengths, e.g., a preferred fluorotelomer is a mixture of even-numbered $C_6$-$C_{18}$ 1,1,2,2-tetrahydroperfluoro-1-alcohols, the majority of which are between 8 and 12 carbon atoms in length. Monomers with a single chain length are generally obtained by direct fluorination.

The reactive aliphatic alcohol may be straight or branched with one or more hydroxyl moieties. Preferred aliphatic alcohols have 1-24 carbon atoms and most preferably have 10-20 carbon atoms.

The reactive amine is preferably a long chain amine that is capable of reacting with the anhydride monomer and perfluorinated alcohol under polymerization conditions. Suitable reactive amines have about 10-20, preferably 12-18, and most preferably 16-18 carbon atoms.

The ratio of anhydride monomer, fluorine-containing reactant, and reactive alcohol or amine can be almost any ratio that will form a fluorine-containing polymer or oligomer at polymerization conditions. In general, these components can be used within the molar range of 1:0.1-10:0.1-10 of anhydride monomer: fluorine-containing reactant: reactive alcohol or amine.

If desired, one or more crosslinking agents can be used in the polymerization process to make the fluorochemical additive of the present invention. Short chain diols are useful, e.g. monoethylene glycol, monopropylene glycol, 1,3-butylene glycol, 1,4-butylene glycol. One could also use a fluorinated diol as a crosslinking agent, e.g., the reaction product of a fluorinated mercaptan (2 moles) with 1 mole dibromoneopentyl alcohol as well as the addition of the fluoroalkyl mercaptan to 1,4-butyne-2-diol. One could also add to allyl alcohol to the combination of a fluoroalkyl mercaptan and 1,4-butyne-2-diol to make a new fluoro-alcohol that would be a useful crosslinking agent according to the invention.

The monomers are reacted under polymerization conditions to form the fluorinated additive of the present invention. Exemplary conditions include a temperature within the range from about 140°-180° C. with stirring and water removal until an acid value of less than about 10, preferably less than about 5 mg KOH/g.

Catalysts are desirably used to speed up the reaction and help drive the polymerization toward completion. Any of the esterification or transesterification catalysts well known in the art. Suitable examples include toluene sulfonic acid, sulfuric acid, tin catalysts, zirconium catalysts, titanium catalysts (e.g., tetra-n-butyl titanate), and methanesulfonic acid.

The result of the polymerization process of the invention is a polymer or oligomer containing 40-60% fluorine based on weight. Preferably, the resulting product is a solid that is subsequently ground to chips or a powder of a size suitable for addition to a melt extruder, spinning, or other polymer product forming equipment. Finely divided powders can be added to melt processes or to thermoset polymers.

As used herein, the terms "fiber" and "fibrous" refer to an elongated article, generally made of a thermoplastic resin, wherein the length to diameter ratio of the article is greater than or equal to about 10. Fiber diameters may range from about 0.5 micron up to at least 1,000 microns. Each fiber may have a variety of cross-sectional geometries, may be solid or hollow, and may optionally be colored. "Yarns" are made with a plurality of fibers. The fluorochemicals of this invention modify the individual fibers internally from core to outer surface for uniform properties across the fiber cross section for consistent properties despite removal of external fiber material due to wear.

The fluorochemical additive of the invention is particularly useful when incorporated into synthetic organic polymers, with or without reaction into the polymeric backbone. Such synthetic organic polymers include but are not limited to polyamides including nylon 6 and nylon 66; polyesters such as polyethylene terephthalate; polyolefins such at polyethylene, polypropylene and polybutylene; epoxy resins; urethanes (thermoplastic or thermoset); acrylics; polystyrenes and the like.

Synthetic organic polymeric films, fibers, and molded articles into which the fluorochemicals are added have low surface energy, excellent oil and water repellency, and resistance to soiling. The fluorochemical additive of the invention can also be used as blends with other fluorochemicals or other additives.

Fibers, films, and molded articles containing the fluorochemical additive of the invention can be made by preparing a blend of the fluorochemical additive with a chosen solid synthetic organic polymer by intimately mixing the fluorochemical additive with pelletized or powdered polymer, and melt processing (extrusion or spinning) the blend into fibers or films. The fluorochemical additive can be mixed directly with the synthetic organic polymer as needed or it can be mixed in a "master batch" that is subsequently melted and formed. Alternatively, the fluorochemical additive can be injected with sufficient mixing into a molten polymer stream to form a blend immediately prior to extrusion.

The amount of fluorochemical additive of the invention that should be used is an amount sufficient to enhance the water, oil, and/or alcohol resistance of the resulting polymeric product relative to the same product made with the same polymer but without the fluorochemical of the present invention. Suitable amounts for any specific process, product, and base polymer is readily determined by those with no more than the existing level of ordinary skill in the art with no more than the exercise of routine experimentation. In general, the amount of fluorochemical additive will be that amount which provides from about 100 to 20,000 ppm of fluorine, more preferably 200 to 10,000 ppm fluorine, based on the unit weight of fiber, film, textile, or cast product. It is noted that the fluorochemicals of the present invention may be more efficient than those of the prior art and may therefore be effective in lower than expected doses.

After extrusion, spinning, casting, or other product forming operation, the formed product may be annealed and/or the extrudate embossed by methods known in the art.

The fluorochemical additive of the invention also may be used as aqueous suspensions or emulsions, or as organic solvent solutions in the treatment of textile fibers or filaments during manufacture, e.g., in combination with spin finishes, or in the treatment of porous or fibrous substrates such as textiles, carpets, paper and leather to impart oil, alcohol and water repellency and anti-soiling properties thereto. The fluorochemical treatment may, for example, be carried out by immersion in a cationic, anionic or nonionic bath, and spin finishing. Alternatively, the fluorochemical additive can be co-applied with conventional fiber treating agents such as anti-static or lubricating agents.

The fluorochemical additive of this invention also has utility in making non-woven fabrics, melt- or spun-bonded webs, or laminate structures using a combination of webs, e.g., spun bond/melt blown/spun bond laminates wherein one or more layers in a composite contain the fluorochemical additive of the invention. Multi-layer constructions made from non-woven fabrics enjoy wide industrial and commercial utility and include uses such as medical fabrics, apparel, industrial apparel, outdoor fabrics, home furnishings, table linens, shower curtains, and many other uses. Embossing can be added to one or more layers within a composite for enhanced aesthetic appeal as well as functional characteristics that add loft to rolls or superimposed layers of composite.

Non-wovens fabrics are typically a multi-layer laminate construction of one or more types of thermoplastic polymers. The inner and outer layers have a spun bond (SB) structure. At least one middle layer, often 1-2 layers, is made of melt blown (MB) fibers. When two middle MB layers are used, the web is said to have a "SMMS" construction are typically described according to the following system:

| Layer | Nomenclature | Type |
| --- | --- | --- |
| Inner | B | SB |
| Middle 1 | C | MB |
| Middle 2 | D | MB |
| Outer | E | SB |

There is also an "SMS" construction where there is only one melt blown layer between two spun bond layers. These SMMS and SMS constructions are used in medical drapes or masks. The E layer would be the side towards the embossing roll.

For the present invention with the present fluorochemical additive, the B layer (the one away from the embossing roller) does not require use of the fluorochemical additive of the present invention although it can be used, if desired. The ability to make a nonwoven web having enhanced water, oil, and alcohol resistance without the use of fluorochemical additive in both inner and outer layers allows a savings in additive for the manufacture of fabrics, drapes, and similar products made from a nonwoven web according to the invention.

Films of the invention can be made from blends of synthetic organic polymer and the described fluorochemical additive by any film making method commonly employed in the art. Such films may be non-porous, porous or microporous, where the presence and degree of porosity is selected according to desired performance characteristics.

TEST METHODS

Each of the test methods employed herein were the same as described in WO 99/05345, herein incorporated by reference in its entirety.

Melt-Blown Extrusion Procedure: The melt-blown extrusion procedure was the same as described in U.S. Pat. No. 5,300,357, col. 10, herein incorporated by reference. The extruder that was used is a Brabender 42 mm conical twin-screw extruder, with maximum extrusion temperature of 270-280° C. and distance to the collector of 12 inches (30 cm).

Mixtures of the fluorochemical additive and the synthetic thermoplastic polymer were made by blending in a paperboard container using a mixer head affixed to a hand drill for about one minute until a visually homogeneous mixture was obtained.

The process conditions for each mixture were the same, including the melt blowing die construction used to blow the microfiber web (50±5 gm/cm$^2$) and the diameter of the microfibers (5-518 micrometers). Unless otherwise stated, the extrusion temperature was 210° C., the pressure was 124 kPa (18 psi) with a 0.076 cm air gap width, and the polymer throughput was about 180 g/hr/cm.

Spunbond Extrusion Procedure: The extruder used was a Reifenhauser Extruder Model Number RT 381 (available from Reifenhauser Co., Troisdorf, Nordrhein Wesfalen, Germany). The extruder was driven by an infinitely variable 3ø shunt wound DC motor, 37.3 kW& 2200rev/min max. The maximum screw speed was reduced to 150 rev/min. The screw was 70 mm in diameter and 2100 mm in length. The entire extruder was 2.3 m in length by 1.3 m in width by 1.6 m in height, weighing 2200 kg. There were five 220 V heating zones at a total 22.1 kW of heating power, giving a maximum heating zone temperature of 210° C.

The bonder was a Kusters Two-Bowl-Thermobonding-Calendar (available from Kusters Corp., Nordrhein Westfalen, Germany). The effective bonding width was 1.2 m. The upper patterned metal roll had a 15% bonding area and a temperature of 270° F. (132° C.), while the lower rubber roll had a slick surface and a temperature of 265° F. (129° C.), the bonding nip pressure was 57-860 pounds of force per linear inch (3000-46,000 J/cm). The rolls were heated by convection from continuously circulating furnace oil. The temperature range of the nips was 200-300° F. (93-149° C.). The bonder's speed was directly synchronized to the speed of the collection belt that had a range of 3.6 to 65 linear meters per minute.

The basis weight for the nonwoven web (in g/m$^2$) can be calculated by multiplying the speed of the spin pump (rev/m) times the constant 71.

Embossing Procedure: Nonwoven samples were embossed using a top roll with a 15% contact area diamond pattern metal top roll set at 98° C. and a rubber bottom roll set at 104° C., with a gap between the rolls of less the 2 mil (50 microns), at a pressure of 30 psi (1550 torr) between the top and bottom rolls, and at a linear speed of 8.3 ft/min(2.5 m/min).

Thermal Gravimetric Analysis (TGA) Test: Unless otherwise stated, a DuPont Instruments Model 951 Thermogravimetric Analyzer was used, and the sample was heated from room temperature at a rate of 10° C./min. The percent of the sample left when a given temperature was reached (usually 220° C., 280° C., 320° C. and 340° C.) was reported. It is desirable to have at least about 90% of the sample remaining after heating to 320° C. so that the fluorochemical additive is resistant to high temperature processing.

In a variant of this test, a sample of fluorochemical additive is heated at a rate of 100° C./min to 220° C., 280° C. or 320° C. and held at the respective temperature. The percent of the sample left after different numbers of minutes was measured and recorded as "% TGA remaining".

Water Repellency Test: Nonwoven web samples were evaluated for water repellency using 3M Water Repellency Test V for Floorcoverings (February 1994), available from 3M Company. In this test, samples are challenged to penetrations by blends of deionized water and isopropyl alcohol (IPA). Each blend was assigned a rating number as shown below:

| Water Repellency Rating | Blend (% by volume, water/IPA) |
| --- | --- |
| 0 | 100% water |
| 1 | 90/10 |
| 2 | 80/20 |
| 3 | 70/30 |
| 4 | 60/40 |
| 5 | 50/50 |
| 6 | 40/60 |
| 7 | 30/70 |
| 8 | 20/80 |
| 9 | 10/90 |
| 10 | 100% IPA |

In running the Water Repellency Test, a nonwoven web sample was placed on a flat, horizontal surface. Five small drops of water or a water/fluorochemical additive sample were gently placed at points at least two inches apart on the sample. If, after observing for ten seconds at a 45° angle, four of the five drops were visible as a sphere or a hemisphere, the nonwoven web sample was deemed to have passed the test. The reported water repellency rating corresponds to the highest numbered water or water/mixture for which the nonwoven sample passed the described test.

It is desirable to have a water repellency rating of at least four, preferably at least six.

Oil Repellency Test: Nonwoven web samples were evaluated for oil repellency using 3M Oil Repellency Test III (February 1994), available from 3M Company, St. Paul, Minn. In this test, samples are challenged to penetration by oil or oil mixtures of varying surface tensions. Oils and oil mixtures are given a rating corresponding to the following:

| Repellency Rating No. | Oil Composition |
| --- | --- |
| 0 | (fails Kaydol ™ mineral oil) |
| 1 | Kaydol ™ mineral oil |
| 2 | 65/35 (vol.) mineral oil/n-hexadecane |
| 3 | n-hexadecane |
| 4 | n-tetradecane |
| 5 | n-dodecane |
| 6 | n-decane |
| 7 | n-octane |
| 8 | n-heptane |

The following examples are offered by way by of illustration only and to aid in the understanding of the invention. They are not to be construed as limiting the scope of the invention.

EXAMPLES

In the examples below, unless otherwise indicated, the acid starting material is 1,2,4-Benezenetricarboxylic anhydride, also called trimellitic anhydride (CAS Registry Number 552-30-7).

Alcohol 1 identified in the examples as Zonyl® BA is a fluorotelomer from DuPont Chemical Enterprises, Wilmington, Del. It is a mixture of even-numbered $C_6$-$C_{18}$ 1,1,2,2-tetrahydroperfluoro-1-alcohols, the majority of which are between 8 and 12 carbon atoms in length. The mixture has a boiling point of 145-245° C. (293-473° F.) at 1 atm; a melting point of 55-65° C. (131-149° F.) and a specific gravity of 1.7.

Alcohol 2 identified in the examples is 1-Octadecanol, also called stearyl alcohol (CAS Registry Number 112-92-5). This material may be derived from natural (e.g. animal or vegetable-based) or petrochemical feedstocks.

Escorene™ PP3505 is polypropylene having a melt flow rate of 400, which is commercially available from Exxon Chemical Company, Baytown, Tex.

Aspun™ 6806 is polyethylene having a melt index of 105 g/10 min (as measured by Test Method ASTM D-1238) and a peak melting point of 124.8° C. It is commercially available from Dow Chemical Company, Midland Mich.

Morthane™ PS 400 is a thermoplastic polyurethane resin having a Shore A Hardness (one sec delay) of 89 and a melting point range of 140-210° and is commercially available from Shell Chemical Company.

PET 35 is polyethylene terephthalate that is commercially available from BASF Corporation, Mt. Olive, N.J.

Ultramid™ B-3 is nylon 6 polyamide resin having a melting point of 220° C., a number average molecular weight of 15,000 and a melt viscosity of 140 Pa·s at 250° C. (D=1000 s$^{-1}$). It is commercially available from BASF Corp., Parsippany, N.J.

Unless otherwise indicated in the examples, all parts and percentages are by weight. Whenever a "control" is designated, it signifies a composition identical to the one which is tested but lacking the additive described in that example.

Synthesis of Fluorochemical Additives

Example 1

A 50 gallon glass-lined reactor is charged with 38.5 pounds trimellitic anhydride (BP-Amoco); 220 pounds Zonyl® BA C6-C18 tetrahydroperfluoro-1-alcohol telomer (DuPont Chemical Enterprises); 64 pounds 1-Octadecanol (Sasol); 322 grams 70% aqueous methanesulfonic acid; and 304 grams Irgafos 168 (Ciba Specialties). The reaction mass is heated, with stirring, to 150-160° C. and reaction water is distilled out until an acid value is less than 4 mg KOH/g sample is obtained. The molten reaction mass is flaked or discharged to trays and allowed to freeze. The product is then ground to a powder. The yield is 272 pounds of a light tan solid, melting at 52° C. The fluorine content was determined to be 47.1% by weight. The TGA profile as percent product remaining was determined at the following temperatures. This fluorochemical additive product is referred to hereinbelow as FC-1.

| | Temperature | | | |
|---|---|---|---|---|
| | 220° C. | 280° C. | 320° | 340° C. |
| % Remaining | 98 | 97 | 95 | 93 |

Example 2

Example 1 was repeated in a vented rotary ball mill/dryer with external heating. The reaction mass was heated at 155° C. until the acid value was less than 4 mg KOH/gram sample. The yield was 5160 grams of tan power with a melting point of 52.4° C. and a fluorine content of 46.7% by weight.

Example 3

Example 2 was repeated on a laboratory scale in a Brabender Prep Center. The machine was charged with 220 grams Zonyl BA, 64 grams 1-Octadecanol, 38.5 grams Trimellitic anhydride, 0.3 grams 70% Methanesulfonic acid and 0.3 grams Irgafos 168. The reaction mass was held at 160° C. until the acid value was less than 4 mg KOH/gram sample. The yield was 270 grams of a tan solid melting at 54° C. with a fluorine content of 46.1% by weight.

Use of Fluorochemical Additive to Confer Hydrophobicity and Oleophobicity to Synthetic Organic Polymers Non-Woven Fabrics Escorene™ PP 3505 chips were blended with the fluorochemical additive FC-1 described in Example 1 above at 1.00 percent by weight solids and thermally extruded into non-woven webs using the Melt-Blown Extrusion Procedure. The non-woven webs were evaluated for repellency using the above-described Water Repellency and Oil Repellency Tests. Both tests were done immediately after extrusion; after holding for ten days at room temperature; and after the above-described Embossing Procedure was performed.

| Escorene™ PP 3505 | | | | | | |
|---|---|---|---|---|---|---|
| | Water Repellency | | | Oil Repellency | | |
| | Initial | 10 days | Embossed | Initial | 10 days | Embossed |
| Control | 2 | 2 | 2 | 0 | 0 | 0 |
| FC-1 | 8 | 8 | 9 | 3 | 1 | 4 |

The procedure described immediately above was repeated except using four different polymers: Aspun™ 6806 polyethylene; Morthane™ PS 400 polyurethane; PET 35 polyethylene terephthalate; and BASF Ultramid™ B-3 nylon; the results are described below.

| Aspun™ 6806 Polyethylene | | | | | | |
|---|---|---|---|---|---|---|
| | Water Repellency | | | Oil Repellency | | |
| | Initial | 10 days | Embossed | Initial | 10 days | Embossed |
| Control | 2 | 2 | 2 | 0 | 0 | 0 |
| FC-1 | 9 | 9 | 9 | 3 | 1 | 2 |

| Morthane™ PS 400 Polyurethane | | | | | | |
|---|---|---|---|---|---|---|
| | Water Repellency | | | Oil Repellency | | |
| | Initial | 10 days | Embossed | Initial | 10 days | Embossed |
| Control | 2 | 2 | 3 | 0 | 0 | 0 |
| FC-1 | 7 | 8 | 9 | 4 | 5 | 6 |

| PET 35 Polyethylene Terephthalate | | | | | | |
|---|---|---|---|---|---|---|
| | Water Repellency | | | Oil Repellency | | |
| | Initial | 10 days | Embossed | Initial | 10 days | Embossed |
| Control | 1 | 1 | 1 | 0 | 0 | 1 |
| FC-1 | 3 | 4 | 4 | 2 | 3 | 3 |

| BASF Ultramid™ B-3 Nylon | | | | | | |
|---|---|---|---|---|---|---|
| | Water Repellency | | | Oil Repellency | | |
| | Initial | 10 days | Embossed | Initial | 10 days | Embossed |
| Control | 0 | 0 | 0 | 0 | 0 | 0 |
| FC-1 | 2 | 2 | 2 | 1 | 1 | 1 |

Concentration Dependence of Fluorochemical Additive Polymer in Non-Woven Fabric The polymer used above, Escorene™PP3505, was subjected to Water Repellency tests at 5 and 120 min. and Oil Repellency tests at 5 min. at 0.5, 0.75, 1.00 and 1.5 weight percent, based on total weight. The following values were noted:

| Escorene™ PP 3505 | | | |
|---|---|---|---|
| | Water Repellency | | Oil Repellency |
| Concentration | 5 Minutes | 120 Minutes | 5 Minutes |
| 0.5 | 3 | 4 | 0 |
| 0.75 | 5 | 4 | 3 |
| 1.00 | 8 | 7 | 4 |
| 1.5 | 8 | 8 | 5 |

Films Incorporating Fluorochemical Additive

To the polymer used above and identified as Escorene™PP 3505 from Exxon Chemical Company, was added 1.25% by weight of FC-1. The mixture was made into a film, according to the following procedure, as was the control material, which comprised the Escorene polymer with no additive.

A sandwich construction was assembled consisting of a rectangular steel plate of 25.4 cm length and 15.3 cm width, a copper foil of dimensions similar to those of the steel plate, and a rectangular steel shim of 25.4 cm length, 15.3 cm width and 254 microns thickness in which a centered rectangular cutout of 10.1 cm by 8.7 cm was made. Next, 2.5 g of spunbond polypropylene was folded into the center of the cutout area with approximate open margin border of approximately 1 cm on each side. The fabric was covered with more copper foil and another rectangular steel plate of the same dimensions used in the rest of the construction. The sandwich construction was placed between the plates of a press, each plate being heated to 200° C., and the plates were brought together with a force of 5 tons for a 4 inch (10.2 cm) diameter circle (587,000 kg/m$^2$) for 2 minutes. Afterwards, the sandwich construction was removed form the heated plates and was placed between two unheated plates on the press at a much lower pressure to cool for 1 minute. The construction was disassembled and the film extracted for testing.

The films were subjected to Water, Alcohol and Oil Repellency tests as described above. The following properties were noted.

|  | Film Thickness | Water Repellency | Alcohol Repellency | Oil Repellency |
| --- | --- | --- | --- | --- |
| Control | 10.6 | 4 | 1 | 0 |
| 1.0% FC-1 | 11.0 | 10 | 7 | 5 |

Epoxy Castings Using Fluorochemical Additive

A composition containing 1.25% of FC-1 was made into epoxy castings from a two-part, room temperature curable, thermoset epoxy resin system (3M Scotch-Weld™ 2158 B/A Epoxy Adhesive Tube Kit) with and without the fluorochemical additive (for the control). After curing, the castings were submitted to testing as reported below.

|  | Water Repellency | Oil Repellency |
| --- | --- | --- |
| Control | 2 | 1 |
| 1.0% FC-1 | 10 | 8 |

Various modifications and alterations of this invention will be apparent to those skilled in the art without departing from the scope and spirit of this invention, and it should be understood that this invention is not limited to the illustrative embodiments as set forth herein.

What is claimed is:

1. A solid fluorochemical additive that is thermally stable at a melt processing temperature and which enhances water and/or oil resistance to products made from a molten thermoplastic polymer or curable thermoset polymer having said additive incorporated therein, said additive comprising the polymerization reaction product under polymerization conditions of monomers that comprise:(a) an aromatic polycarboxylic acid, anhydride, ester, or ester chloride; (b) at least one fluorinated reactant; and (c) at least one reactive aliphatic amine, mercaptan, or alcohol, wherein the solid fluorochemical additive contains 40-60% by weight of fluorine.

2. A fluorochemical additive according to claim 1 wherein said additive comprises the polymeric reaction under polymerization conditions of monomers that comprise: (a) an aromatic anhydride monomer that contains at least one anhydride functional group or is capable of forming an anhydride functional group under polymerization conditions, (b) a fluorine-containing amine, alcohol, or mercaptan, and (c) a reactive aliphatic alcohol or amine.

3. A fluorochemical additive according to claim 2 wherein said aromatic anhydride monomer is an aromatic carboxylic acid having 2-4 carboxylic acid groups capable of forming an anhydride functional group under polymerization conditions or a carboxylic acid anhydride.

4. A fluorochemical additive according to claim 2 wherein the aromatic anhydride monomer comprises trimellitic anhydride.

5. A fluorochemical additive according to claim 2 wherein said fluorine-containing reactant is a partially fluorinated or perfluorinated straight or branched chain alcohol comprising about 2 to about 40 carbon atoms in length.

6. A fluorochemical additive according to claim 5 wherein said fluorine-containing reactant is a partially fluorinated or perfluorinated straight or branched chain alcohol comprising about 6 to about 18 carbon atoms.

7. A fluorochemical additive according to claim 5 wherein said fluorine-containing reactant is an alcohol that is completely fluorinated.

8. A fluorochemical additive according to claim 5 wherein said fluorine-containing reactant has between 2 and about 6 hydrogen substituents.

9. A fluorochemical additive according to claim 5 wherein said fluorine-containing reactant is a tetrahydro-substituted alcohol with remaining substituents being fluorine.

10. A fluorochemical additive according to claim 5 wherein said fluorine-containing reactant is an alcohol that contains a terminus of either ($CH_3$—) or ($CHF_2$—).

11. A fluorochemical additive according to claim 5 wherein said fluorine-containing reactant is a fluorotelomer.

12. A fluorochemical additive according to claim 11 wherein said fluorine-containing reactant is a mixture of even-numbered $C_6$-$C_{18}$ 1,1,2,2-tetrahydroperfluoro-1-alcohols.

13. A fluorochemical additive according to claim 2 wherein said reactive alcohol or amine is a straight or branched alcohol with one or more hydroxyl moieties.

14. A fluorochemical additive according to claim 13 wherein the reactive alcohol has 12-30 carbon atoms.

15. A fluorochemical additive according to claim 14 wherein the reactive alcohol has 15-20 carbon atoms.

16. A fluorochemical additive according to claim 1 wherein said polymerization conditions comprise a temperature within the range from about 140°-180° C.

17. A fluorochemical additive according to claim 1 that comprises the reaction product of: (a) trimellitic anhydride, (b) a fluorotelomer comprising a mixture of even-numbered $C_6$-$C_{18}$ 1,1,2,2-tetrahydroperfluoro-1-alcohols, and (c) stearyl alcohol that has been polymerized a temperature within the range from about 140°-180° C.

* * * * *